United States Patent

Ra et al.

[11] Patent Number: 5,106,353
[45] Date of Patent: Apr. 21, 1992

[54] VARIABLE TRANSMISSION

[76] Inventors: Jong O. Ra, 24-1, 265-154
Bokwang-dong, Yongsan-ku, Seoul;
Joon Y. Lim, Duckyong Villa
KA-204, 141-2, Duckjeong-ri,
Hoecheon-eup, Yangju-kun,
Kyungki-do, both of Rep. of Korea

[21] Appl. No.: 522,204

[22] Filed: May 11, 1990

[30] Foreign Application Priority Data

May 17, 1989 [KR] Rep. of Korea ......... 89-6597

[51] Int. Cl.$^5$ .......... F16H 3/44; F16H 57/10
[52] U.S. Cl. ................. 475/308; 475/269;
475/273; 475/306; 475/336
[58] Field of Search ......... 475/221, 223, 224, 230,
475/231, 237, 238, 239, 269, 271, 273, 274, 150,
220, 330, 311, 306, 308–310, 336

[56] References Cited

U.S. PATENT DOCUMENTS

| | | |
|---|---|---|
| 948,694 | 2/1910 | Fodrea .................. 475/273 |
| 1,457,945 | 6/1923 | Smith .................. 475/273 |
| 1,567,490 | 12/1925 | Cedillo .................. 475/273 X |
| 1,600,317 | 9/1926 | Cedillo .................. 475/273 |
| 1,860,017 | 5/1932 | Cook .................. 475/273 X |
| 3,164,035 | 1/1965 | Ellis et al. .................. 475/273 X |
| 3,403,584 | 10/1968 | Ellis et al. .................. 475/273 X |
| 3,511,112 | 5/1970 | Power et al. .................. 475/273 X |
| 3,770,879 | 11/1973 | Watson .................. 475/7 |

Primary Examiner—Richard Lorence
Assistant Examiner—David E. Henn
Attorney, Agent, or Firm—Limbach & Limbach

[57] ABSTRACT

A variable transmission is disclosed. An input shaft for rotational input has a first gear securably mounted at the terminal end of the input. A cross shaft is spaced apart from the terminal end of the input shaft and a second gear is securely mounted at the second end of the cross shaft with the second gear in direct mechanical communication with the first gear. A fifth gear with a hub is rotatably mounted on the input shaft. A third gear is securably mounted at the first end of the cross shaft with the third gear being in direct mechanical communication with the fifth gear. An output shaft terminates in a fourth gear with the fourth gear positioned opposite the fifth gear and in direct mechanical communication with the third gear. The first end and the second end of the cross shaft are secured to enable rotation of the cross shaft about the first axis of the cross shaft and to further enable rotation of the cross shaft about a second axis of the cross shaft with the second axis being perpendicular relative to the first axis. A brake controls the rotation of the hub of the fifth gear to initiate and vary the rotation of the output shaft by manipulating the brake. An interlocking control directly combines the rotation of the input shaft with the hub.

12 Claims, 7 Drawing Sheets

VARIABLE TRANSMISSION

BACKGROUND OF THE INVENTION

1. Field of the Invention

The present invention relates to a continuously variable transmission, and more particularly to a transmission which can convert and transmit the power of an engine to comply with the load on the output shaft without engaging, or disengaging the gears with a shift lever.

In general, a transmission device converts and transmits the power generated by an engine to comply with the load placed on the output shaft. Prior art transmission devices utilize a hand-operated shift lever and a foot-operated clutch to cut the power between the input side receiving the power from the engine and the transmission device in order to accomplish a shifting of the gears. Automatic transmissions are those which do not need a foot clutch.

A continuously automatic transmission device which makes it possible to convert and to transmit power without a clutch by using a combination of differential gears consisting of ring gears, planetary gears and sun gears, is described in U.S. patent application Ser. No. 347,916, filed May 5, 1989. Further, another continuous transmission uses a combination of bevel gears and worm gears and is fully described in a U.S. Pat. No. 3,770,879 by Thomas A.W.K. Watson.

However, such transmission devices fail to provide smooth transmission steps and utilize a complicated structure. Hence there is a need for the development of a transmission device which provides excellent capability and simple structure.

The object of the present invention is to provide a continuously variable transmission which is very efficient, capable of converting and transmitting power to the output shaft in a smooth and stepless manner while being mechanically simple in design.

SUMMARY OF THE INVENTION

This invention is defined by the appended claims with a specific embodiment illustrated in the attached drawings. For the purpose of summarizing the invention, the invention may be incorporated into a variable transmission, which comprises an input shaft for receiving rotational input and having a terminal end. A first gear is mounted at the terminal end of the input shaft to enable simultaneous rotation with the input shaft. A cross shaft having a first end, a mid point and a second end with the cross shaft spaced apart from the terminal end of the input shaft such that an axis of the input shaft is perpendicular to a first axis of the cross shaft. A second gear is mounted at the second end of the cross shaft to enable simultaneous rotation with the cross shaft and direct mechanical communication with the first gear. A fifth gear with a hub is rotatably mounted on the input shaft to enable independent rotation of the fifth gear and the hub about the input shaft. A third gear is mounted at the first end of the cross shaft to enable simultaneous rotation with the cross shaft and direct mechanical communication with the fifth gear. An output shaft is utilized which terminates in a fourth gear with the fourth gear positioned opposite the fifth gear and in direct mechanical communication with the third gear. A cross shaft securing means secures the first end and the second end of the cross shaft and enables the rotation of the cross shaft about the first axis of the cross shaft and further enables rotation of the cross shaft about a second axis of the cross shaft positioned at the mid point of the cross shaft with the second axis being perpendicular relative to the first axis. A brake means controls the rotation of the hub of the fifth gear such that in use in order to initiate rotation of the output shaft the brake means is manipulated to gradually increase the rotational resistance on the hub of the fifth gear thereby directing the rotational force to the output shaft through the fourth gear which has less rotational resistance relative to the fifth gear. Upon further manipulation, the brake means stops the rotation of the fifth gear subsequent to the initial rotation of the output shaft to fully inhibit rotation of the hub of the fifth gear such that the rotational power of the input shaft is transferred to the cross shaft causing a greater increase in rotational force in the third gear thereby increasing the rotational force delivered to the output shaft through the fourth gear which has less rotational resistance relative to the fifth gear. The brake means utilizes such means as frictional force, such as a brake shoe, or electromagnetic force to decrease the rotational speed of the fifth gear. Preferably, direct mechanical communication is attained by the use of beveled gears as illustrated in the figures. However, other means of direct mechanical communication which transfer rotational energy are within the skill of the one skilled in such art.

In the embodiment where the first gear is mounted at the terminal end of the input shaft, the second gear is mounted at the second end of the cross shaft, the third gear is mounted at the first end of the cross shaft, the fourth gear is positioned at the terminal end of the output shaft, and the fifth gear is mounted on the input shaft, as described above, each of the gears is secured to its respective shaft to enable simultaneous rotation therewith. Also, the first and second ends of the cross shaft are rotatably secured to the second aperture and fourth aperture of the case, described below, respectively. This is to ensure, in use, the mechanical stability of the transmission so that the gears maintain mechanical communication as described above.

Preferably, the variable transmission further includes the following gears:

1. a gear 11D rotatably mounted at the first end of the cross shaft to enable independent rotation about the cross shaft and with gear 11D being in direct mechanical communication with the first gear and gear 11C (below);

2. a gear 11C mounted opposite the first gear and with gear 11C being in direct mechanical communication with gear 11D and second gear; and 3. a gear 14B positioned opposite the third gear and being rotatably mounted at the second end of the cross shaft to enable independent rotation about the cross shaft and being in direct mechanical communication with the fifth gear and the fourth gear. Gear 11C is preferably mounted in the transmission by the use of an idler shaft having a first and a second end. Gear 11C is mounted on the first end of the idler shaft and the second end of the idler shaft is rotatably received into an axial bore which is formed in the terminal end of the output shaft so that the gear 11C is able to rotate independently relative to the output shaft.

The cross shaft securing means preferably comprises a case which encloses the transmission device and has a first, a second, a third and a fourth aperture formed therein. The hub of the fifth gear is rotatably received by the first aperture of the case and the output shaft is rotatably received by the third aperture of the case. The first end of the cross shaft is rotatably received by the second aperture of the case. The second end of the cross shaft is rotatably received by the fourth aperture of the case. The case enables the cross shaft to rotate within the second and fourth apertures and further enables the case to rotate in either a clockwise or a counterclockwise direction, or not to rotate about the hub and the output shaft, i.e., such rotation being independent from the rotation of the hub and the output shaft. Preferably, bearings are positioned in each of the apertures to enhance rotation of the cross shaft which is rotatably received in the second and fourth apertures, respectively, and the hub and output shaft, which are rotatably received in the first aperture and third aperture, respectively.

An interlocking control means preferably directly couples the rotational output of the input shaft to the hub of the fifth gear such that in use the rotational rate of the output shaft is the same as the rotational rate of the input shaft.

The present invention is constructed in such a way that a second bevel gear is rotated by the rotation of a first bevel gear which is directly connected to an input shaft. Upon rotation of the second bevel gear a third bevel gear is rotated which is installed outside of the first and the second bevel gear and which is integrally engaged with a cross shaft to which the second bevel gear is also engaged. Upon rotation of the third bevel gear a fourth bevel gear, which is integrally formed with the output shaft, is rotated so as to convert and transmit the power to the output shaft evenly, i.e., absent shift steps, and by controlling the rotation of a fifth bevel gear, which is meshed with the third bevel gear, the variation ratio is adjusted.

The advantage of the continuously variable transmission of the present invention is that the transmission has a simple structure, produces little noise and is very efficient.

Accordingly, this transmission device can be applied to all mechanisms such as a car, an industrial machine and the like, to convert and transmit the rotational driving force from the input shaft to the output shaft.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
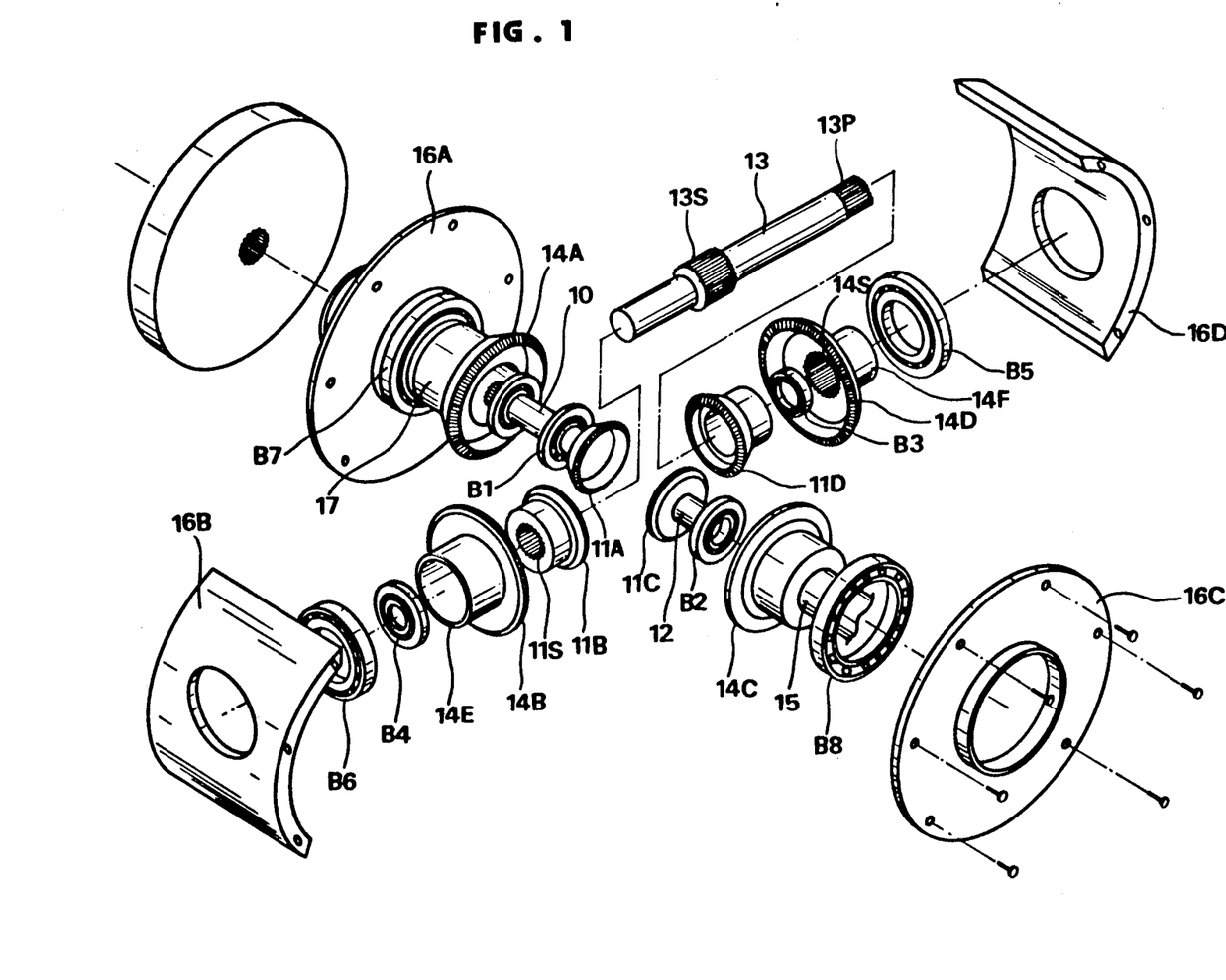
FIG. 1 is an exploded perspective view of the transmission device of the present invention.
Figure 2:
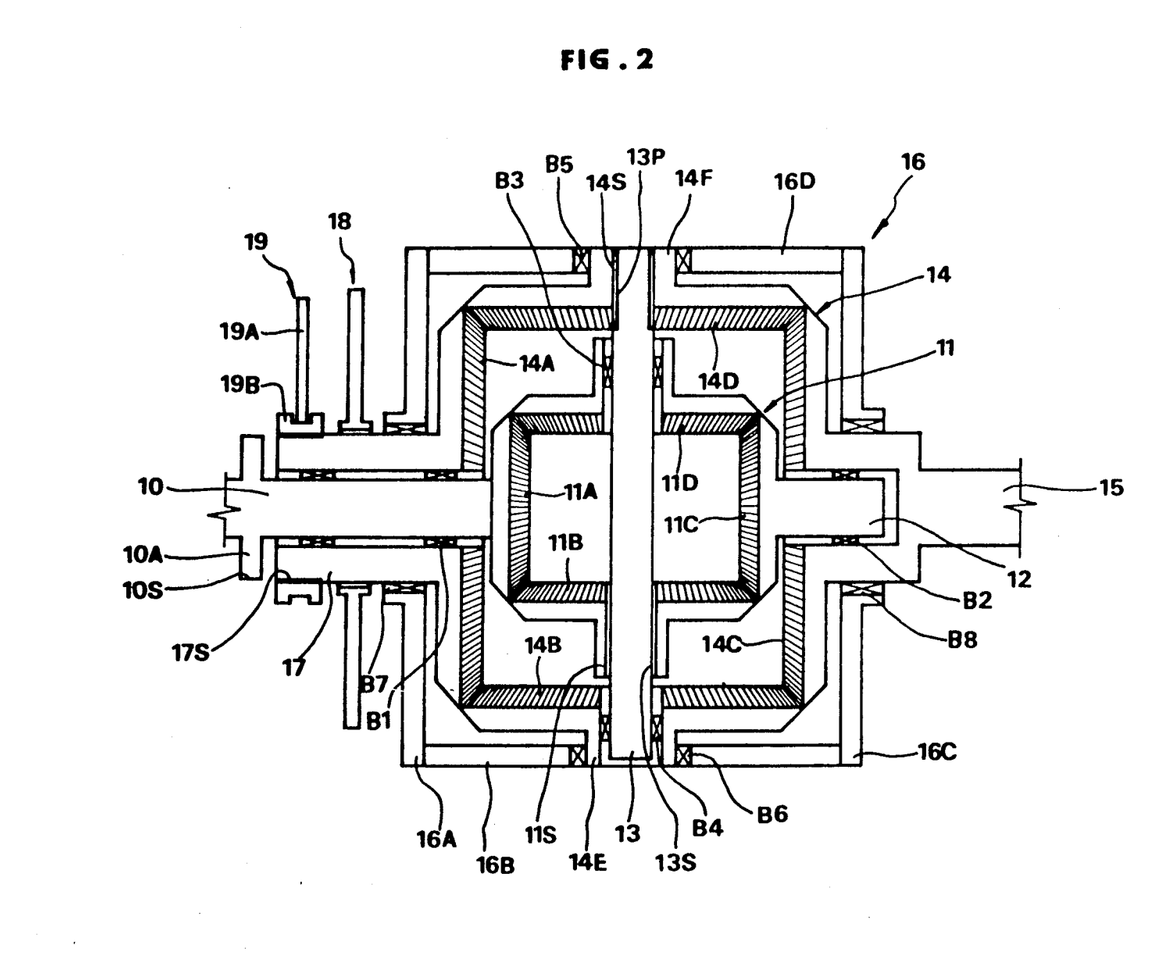
FIG. 2 is an assembled sectional view of the transmission device of FIG. 1.

FIG. 1 is an exploded perspective view and FIG. 2 is an assembled sectional view of the continuously variable transmission device of the present invention.

An input shaft 10 receives the input rotational force from the driving shaft of an engine. A first gear 11A (the first bevel gear) is formed on an end of the input shaft 10. Four bevel gears 11A, 11B (the second bevel gear), 11C (the seventh bevel gear), 11D (the sixth bevel gear) are bevel-meshed to constitute a first set of differential gears 11. Gear 11C is connected to an idler shaft 12. The input shaft 10 and the idler shaft 12 are inserted through and supported by bearings B1, B2 in order that these shafts may freely rotate.

On the input shaft 10 an interlocking section 10A is utilized so that when the interlocking section 10A and the hub section 17 (described below) are interlocked by an interlocking control means 50, i.e., interlocking control system 19, the input shaft 10 and hub section 17 rotate together.

In the interior of gear 11B of the first set of differential gears 11, a spline 11S is formed. A spline 13S is also formed on a cross shaft 13 to mesh with the spline 11S of the gear 11B, then the spline 13S of the cross shaft 13 is inserted into the spline 11S of the gear 11B and the opposite portion to the spline 13S of the cross shaft 13 passes through the gear 11D of the first set of differential gears 11. A bearing B3 is inserted between the cross shaft 13 and the gear 11D so that they can rotate freely. A spline 13P is formed on the extended end (the uppermost portion in FIG. 2) of the cross shaft 13. A spline 14S is formed in the central tube shaft 14F of a gear 14D (the third bevel gear) to be meshed with the spline 13P. The spline 13P of the cross shaft 13 is then inserted in the spline 14S of the gear 14D, and four bevel gears i.e., gears 14A (the fifth bevel gear) 14B (the eighth bevel gear), 14C (the fourth bevel gear) and 14D, are bevel-meshed to constitute a second set of differential gears 14. A bearing B4 is inserted between a tube shaft 14E of the gear 14B and the extension of the cross shaft 13 so that they can rotate freely.

On one side of the gear 14A of the second set of differential gears 14 a hub section 17 is installed for control of the rotation of the second set of differential gears 14 according to the control of the brake means 40, i.e., brake system 18 (rotational resistance imposing means to impose rotational resistance upon the hub section 17 of fifth gear 14A) and interlocking control system 19 which will be described below. While the hub section 17 is shown only as a cylindrical shaft, it can be formed with knurl on its outer surface when it is needed to increase the friction force on braking by compressing the peripheral surface of the hub section 17 with the brake system 18.

In the present embodiment, the hub section 17 is connected on one side of the gear 14A and inserted onto the input shaft with a bearing B1 so that the hub section 17 can rotate freely about the input shaft 10.

On the gear 14C of the second set differential gears 14 an output shaft 15 is connected. The tube shaft 14F of the gear 14D and the tube shaft 14E of the gear 14B of the second set of differential gears are inserted into plates 16D, 16B with the bearings B5, B6 so that the tube shafts 14F, 14E of the gears 14D, 14B can freely rotate in the plates 16D, 16B. Plates 16D, 16B are bolted to rotating plates 16A, 16C so that the plates 16D, 16B and the rotating plates 16A, 16C constitute a cross shaft securing means 60 which includes a can-shaped case or carrier 16. The rotating plates 16A, 16C of the carrier 16 are rotatable by means of bearings B7, B8. In FIG. 2 an embodiment is shown in which the carrier 16 is mounted on the hub section 17 and the output shaft 15 so that the carrier 16 can rotate about the hub section 17 and the output shaft 15. The use of bearings or splines is preferred when free rotation or simultaneous rotation, respectively, is desired. However, other equivalent means having the same function may be substituted to accomplish these purposes.

In the present invention, the brake system and the interlocking control system are employed as a control system to vary the output speed. The brake system 18 (rotational resistance imposing means) can control or brake the rotational speed of the gear 14A of the second set of differential gears 14 which is connected to the hub section 17. Of course, brake system 18 can control or brake the speed of the hub section 17 in various ways, and in the present embodiment the brake system is constructed of the brake lining system such as a hydraulic brake system.

As another control system, the interlocking control system 19 can control the interlocking section 10A together with the hub section 17 so that when the input shaft 10 rotates the hub section 17 also rotates.

In the present embodiment, a spline 17S is formed on one end of the hub section 17, and a spline 10S is formed on the interlocking section 10A of the input shaft 10, then a movable ring 19B formed with a spline therein is installed on either one of the hub section 17 and the interlocking section 10A so that the ring can be meshed with the spline 17S of the hub section 17 and the spline 10S of the interlocking section 10A at the same time, and when needed, a fork 19A inserted on the ring 19B is actuated to move the ring 19B to the left or right so that when the ring 19B is meshed with the splines 17S, 10S of the hub section 17 and interlocking section 10A, the input shaft 10, the ring 19B and the hub section 17 rotate integrally.

As another embodiment of the interlocking control system, the peripheral surface of the hub section 17 and the peripheral surface of the interlocking section 10A may be a hydraulic brake system as in the brake system 18 so that the input shaft 10 and the hub section 17 can rotate together.

The continuously variable transmission of the present invention may be used with any rotational drive means to convert the rotational driving force of the drive means for use in automobiles, industrial machines, and the like. The description of the use of the continuously variable transmission according to the present invention in an automobile follows:

In case the continuously variable transmission of the present invention is used for an automobile, it is recommended that the transmission of the present invention be installed between the driving shaft of the engine and the final reduction gear.

As such, the rotational force can be transmitted from the driving shaft of the engine to transmission according to the present invention where the input rotational force can be converted to a neutral state, a low speed, a medium speed, or a high speed and transmitted to the output shaft 15.

An explanation of the neutral output, the low speed output, medium speed output, and high speed output of the power transmission according to the present invention is set forth below. In this explanation the output shaft 15 is operatively connected to the drive wheels of an automobile.

1. The neutral state, i.e., rotational input to input shaft 10 results in no rotational output to shaft 15, as illustrated at FIG. 3.

Input shaft 10—Gear 11A of the First set of differential gears 11—Gear 11B—Spline 11S—Spline 13S of the Cross shaft 13—Spline 13P of the Cross shaft 13—Spline 14S of the Second set of differential gears 14—Gear 14D—Carrier 16 (idling)

Figure 3:
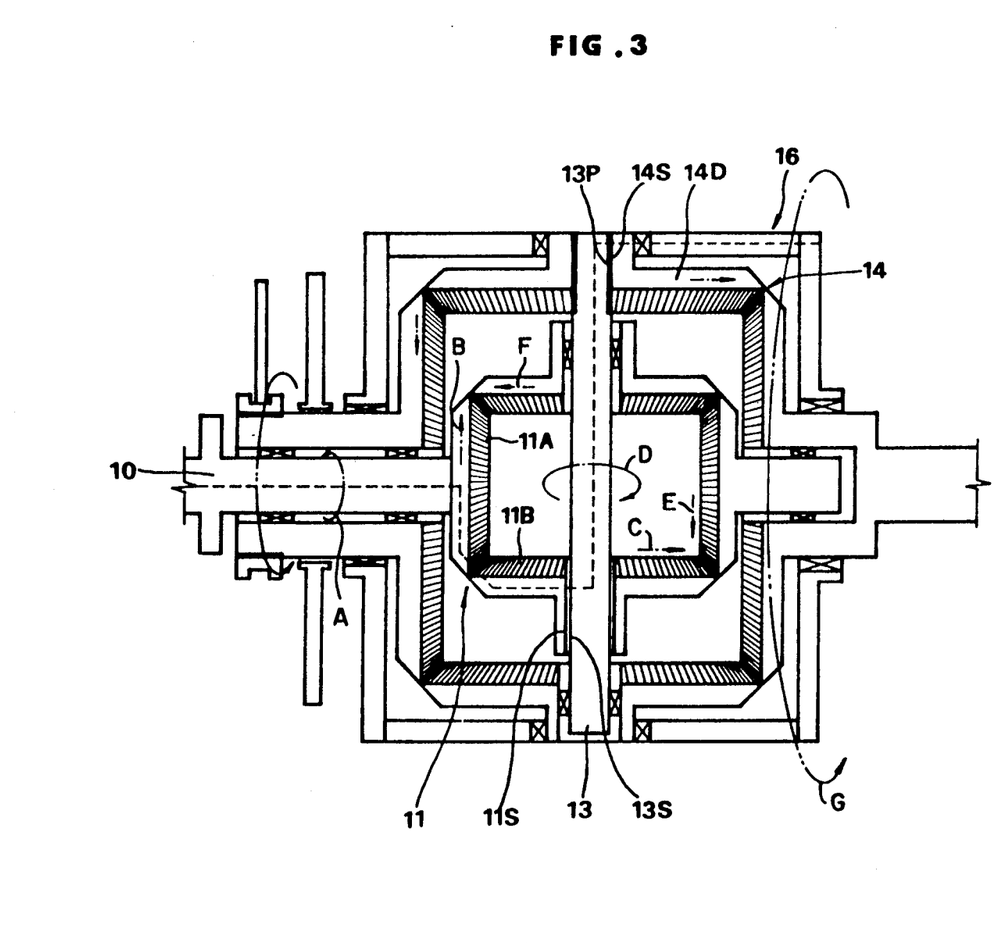
FIG. 3 is a sectional view showing the state in which the transmission device of FIG. 2 is idling in the neutral state.

As shown in FIG. 3, the power transmitted from the driving shaft of the engine to the input shaft 10 rotates the gear 11A of the first set of differential gears 11. Here, if the input shaft 10 rotates in the direction of the arrow A then the gear 11A also rotates in the direction of the arrow B, in turn, the gear 11B meshed with the gear 11A rotates in the direction of the arrow C, then the rotational force of the gear 11B rotates the cross shaft 13 in the direction of the arrow D via the spline 11S of the gear 11B and via the spline 13S of the cross shaft 13 and next rotates the gear 11C, 11D in the direction of the arrows E, F, respectively.

Upon the rotation of the cross shaft 13, the gear 14D rotates which rotates the gear 14A and the hub section 17. Also, the rotation of gear 14D rotates the gear 14C. However, because the output shaft 15 connected to the gear 14C is heavily loaded (in a standstill condition), the rotational force of the gear 14D is not sufficient to rotate the gear 14C. Therefore, the gear 14D begins to revolve. The (kinetic) rotational force of the gear 14D is directed to rotate the entire carrier 16 in the direction of the G arrow rather than rotating the output shaft 15. Thus, the gear 14D, the cross shaft 13 and the carrier 16 rotate together, referred to as "co-rotation", and at the same time, the entire carrier 16 rotates in the direction of the arrow G.

Figure 4:
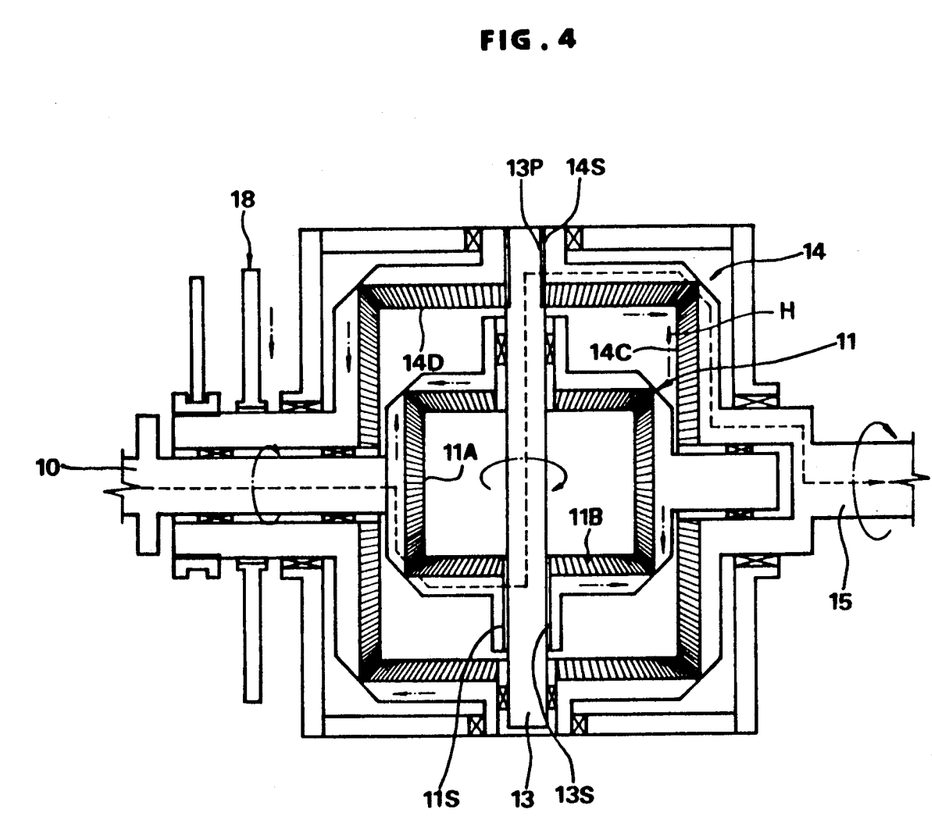
FIG. 4 is a sectional view showing the state in which the input force is transmitted in low speed to the output shaft.

2. Low speed state, i.e., the rotational input to input shaft 10 results in low speed rotational output to shaft 15, as illustrated at FIG. 4.

Input shaft 10—Gear 11A of the First set of differential gears 11—Gear 11B—Spline 11S—Spline 13S of the Cross shaft 13—Cross shaft 13—Spline 13P—Spline 14S of the second set of differential gears 14—Gear 14D—Gear 14C—Output shaft 15

The low speed state is a state in which the automobile starts gradually from a stopped position. When frictional force is gradually applied to the hub section 17 by the brake system 18, the rotational force of the gear 14A decreases and in turn, the revolutionary force of the gear 14D decreases thereby decreasing the rotational force of the carrier 16. The rotational force of the gear 14D causes the gear 14C to rotate in the direction of the arrow H resulting in the gradual rotation of the output shaft 15 to thereby gradually start the automobile. That is, the transmission of the rotational force to the gear 14D is transmitted to the gear 14C and then to the output shaft 15.

Figure 5:
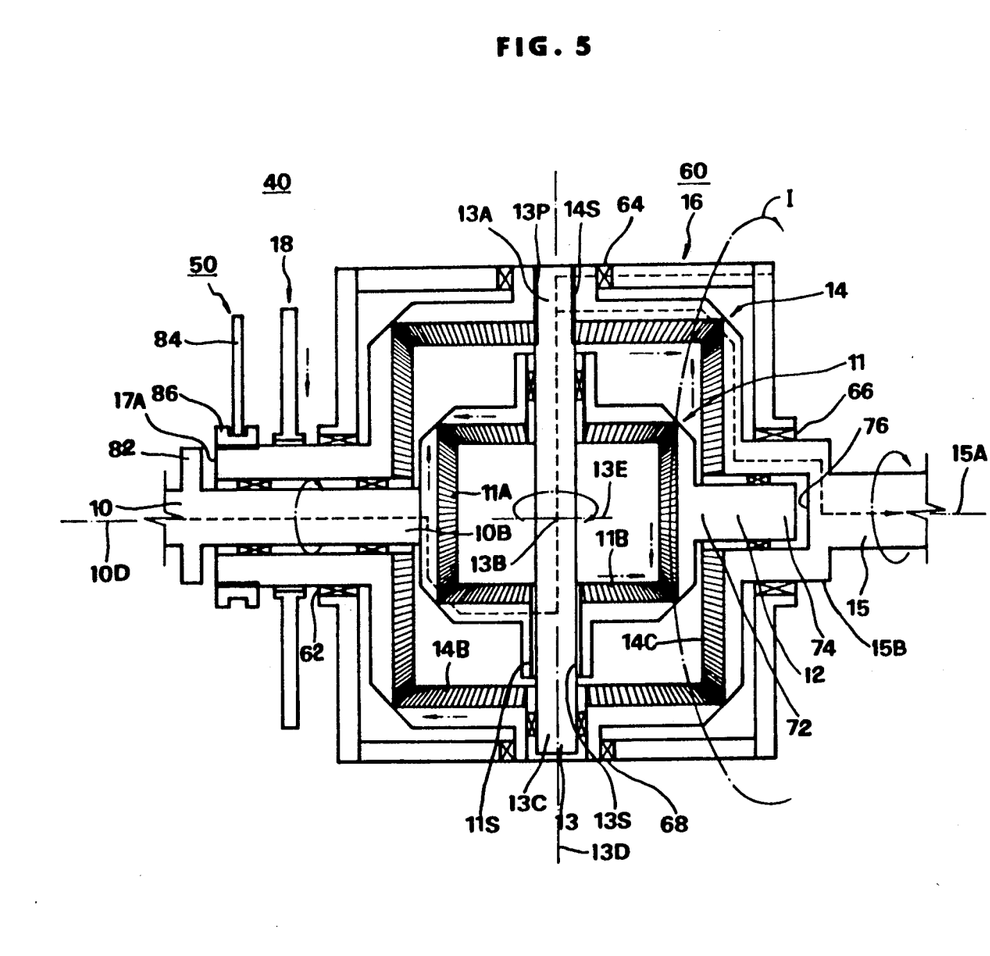
FIG. 5 is a sectional view showing the state in which the input force is transmitted in medium speed to the output shaft.

3. Medium speed state, i.e., the rotational input to input shaft 10 results in medium speed rotational output to shaft 15, as illustrated at FIG. 5.

Input shaft 10—Gear 11A of the First set of differential gears 11—Gear 11B—Spline 11S—Spline 13S of the Cross shaft 13—Cross shaft 13—Spline 13P—Spline 14S of the Second set of differential gears 14—Gear 14D, Carrier 16—Gear 14C—Output shaft 15

To increase the ground speed of the automobile from the low speed state, the rotation of the hub section 17 and therefore gear 14A are brought to a complete stop by the brake system 18. That is, when the frictional force on the hub section 17 is further increased the gear 14A will stop rotating while the rotation of the gear 14D will proportionally increase which in turn will cause an increase in the rotation at the gear 14C and the output shaft 15. Carrier 16 then rotates in the direction of the arrow I, i.e., in a direction opposite to the direction of rotation in the neutral state from a stopped position. Then, upon increasing the rotational input of shaft 10, the rotational speed of the gear 14D increases causing the carrier 16 to rotate in the direction of the arrow I resulting in a further increase in the rotational speed of the output shaft 15.

Figure 6:
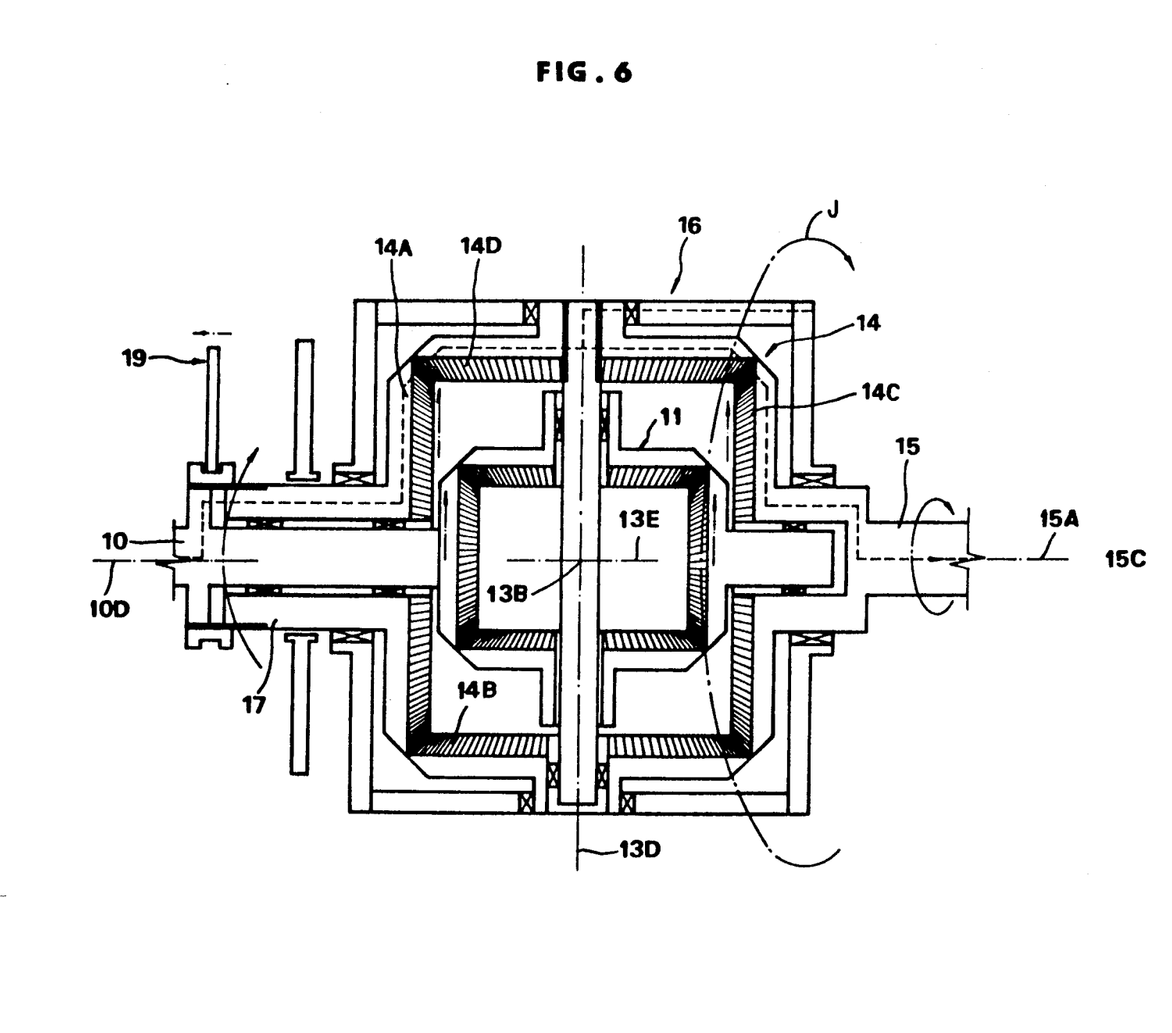
FIG. 6 is a sectional view showing the state in which the input force is transmitted in high speed to the output shaft.

4. High speed state, i.e., the rotational input to input shaft 10 results in high speed rotational output to shaft 15, as illustrated at FIG. 6.

Input shaft 10 and Hub section 17—Gear 14A of the Second set of differential gears 14—Gear 14D, Carrier 16—Gear 14C—Output shaft 15

From the medium speed state, when the ring 19B is meshed with the spline 10S of the interlocking section 10A and with the spline 17S of the hub section 17 and the brake system 18 is released from its operative position and the ring 19B is moved to the left by means of the fork 19A of the interlocking control system 19, the input shaft 10 and the hub section 17 rotate together so that the force is transmitted to the gear 14A of the second set of differential gears 14 connected to the hub section 17. This rotational force increases the co-rotation of the gear 14D and the carrier 16 in the direction of arrow J. In other words, the input shaft 10, the two sets of differential gears 11 and 14, the carrier 16 and the output shaft 15 rotate as an integral body so that the output shaft 15 rotates at the same speed as that of the rotational speed of the input shaft 10 which is derived from the driving shaft of the engine.

To envision the present invention in the high speed state, consider that axis 10D of the input shaft 10, axis 13E of the cross shaft and axis 15A of the output shaft 15 are aligned forming a common axis 15C. Thus, upon the interlocked simultaneous rotation of the input shaft 10 and the section 17, gears 14A, 11A, 11C and 14C and the mid point 13B of the cross shaft rotate about the common axis 15C, whereas gears 14D, 14B, 11D and 11B orbit about the common axis 15C but do not rotate about the first axis 13D of the cross shaft 13 since the carrier 16 is rotating about the common axis 15C.

Figure 7:
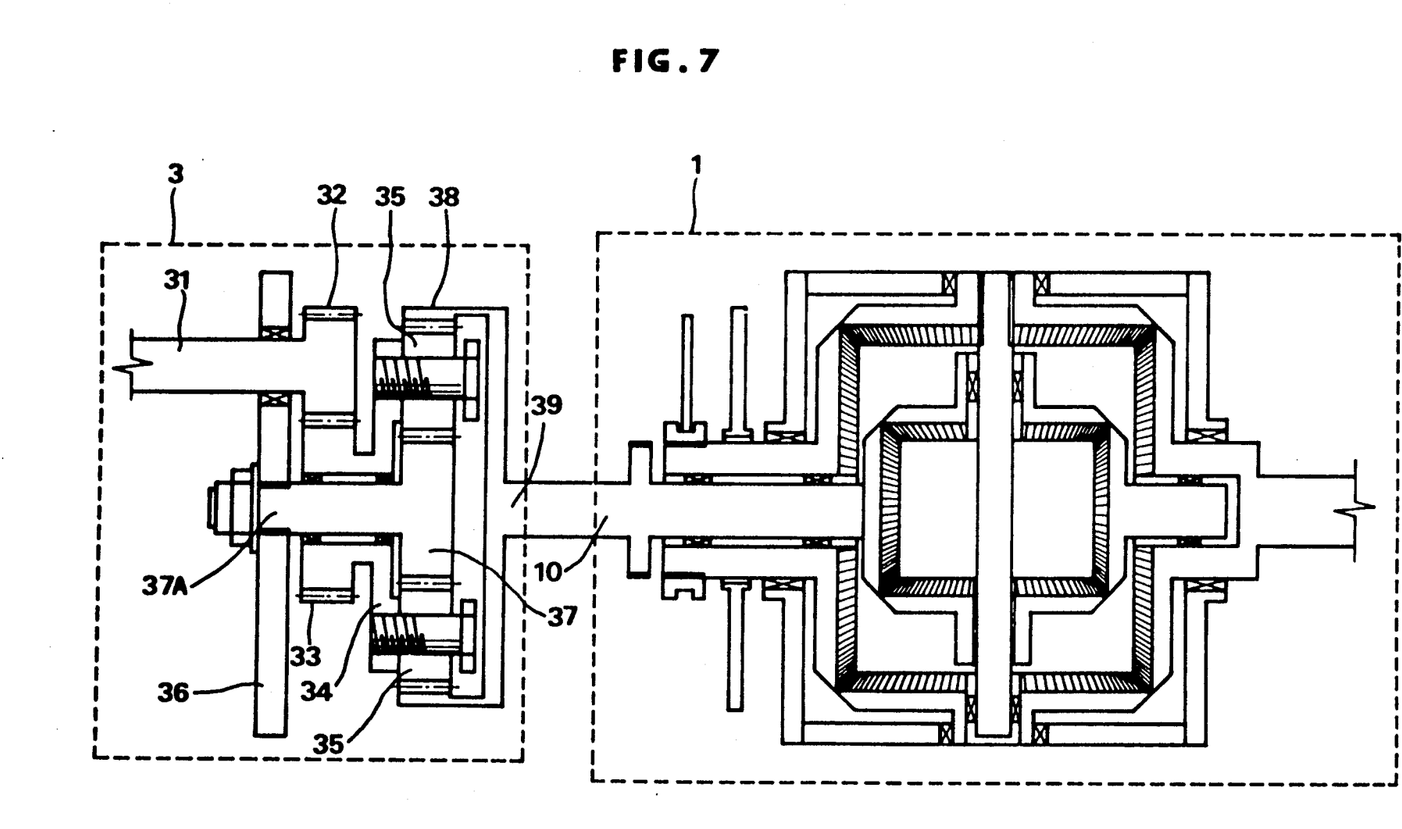
FIG. 7 illustrates the transmission device of the present invention in combination with an overdrive device.

In FIG. 7, an overdrive device is connected to the input shaft 10. The purpose of it is to improve the fuel consumption rate and to decrease the noise of the engine in the medium and the high speed running by making the output speed larger than the input speed of the transmission.

An overdrive device is fully described in PCT Patent Application No. PCT/KR90/00001 filed Feb. 13, 1990, said application being expressly incorporated herein by reference as if fully set forth hereat. The teachings set forth in the above mentioned application may be used in the present application to incorporate the input shaft of the variable transmission so that the overdrive device converts the power generated by an engine to comply with the load on the output shaft of the variable transmission.

Briefly, the construction of the overdrive device and its relevant connection comprises a power shaft 31 which is connected to the driving shaft of the engine to receive the rotational force from the engine. A gear 32 is connected to the power shaft 31 and a gear 33 meshes with the gear 32. The gear 33 and planetary gears 35 are connected to the carrier 34. A sun gear 37 is meshed with the planetary gears 35, and, a central shaft 37A of the sun gear 37 is supported on a fixed support 36. A ring gear 38 is meshed with the outside of the planetary gears 35, and an output shaft 39 is connected to the ring gear 38. The input shaft 10 of the continuously variable transmission 1 is then connected to the output shaft 39 of the overdrive device 3.

If the rotational force is transmitted to the power shaft 31 from the driving shaft of the engine, it is further transmitted as follows: Gear 32—Gear 33—Carrier 34—Planetary gears 35, Sun gear 37—Ring gear 38—Output shaft 39, the rotational speed of the output shaft 39 is larger than that of the power shaft 31, and the rotational force of the output shaft 39 is transmitted to the input shaft 10.

As described above, the continuously variable transmission of the present invention does not require a separate clutch device which connects or disconnects the input shaft and the output shaft when the power of the engine is converted and transmitted through the input shaft to the output shaft, and the continuously variable transmission can convert and transmit the power without engaging, disengaging or changing the gears, so that there are advantages that the production cost is saved because of the simple construction and that quiet driving is possible because of no impact and no vibration.

It shall be noted that the present invention is not limited to the embodiment described above, and there may be various alterations based on the gist of the present invention and such alterations are within the scope of the present invention. Thus, in the present embodiment, the brake system 18, the interlocking control system 19 and the hub section 17 described herein include systems which accomplish their purpose and are within the skill of the ordinary artisan.

With regard to the gears utilized in the present invention, the number of teeth per each gear may be varied in accordance with the desired purpose. One example is described hereafter with the specific numbers of teeth (T), that is, the gear 11A : 16T, the gear 11B : 24T, the gear 11C : 16T, the gear 11D : 24T, the gear 14A : 40T, the gear 14B : 24T, the gear 14C : 40T, the gear 14D : 24T.

In the case where the carrier 16 stops its rotation in low speed state, per 1 turn of the input shaft 10, the output shaft 15 turns as follows:

$$\frac{\text{gear } 11A}{\text{gear } 11B} \times \frac{\text{gear } 14D}{\text{gear } 14C} = \frac{16T}{24T} \times \frac{24T}{40T} = \frac{2}{5} = 0.4 \text{ (turns)}$$

Also, in the case where the gear 14A is at a standstill in the medium speed state, per 1 turn of the input shaft 10, the output shaft 15 turns as follows:

When the gear 14A is at a standstill the number of turns of the carrier 16 is:

$$\frac{\text{gear }11A}{\text{gear }11A + \text{gear }14A} = \frac{16T}{16T + 40T} = \frac{16}{56} = \frac{2}{7} \text{ (turns)}$$

When the gear 14A is at a standstill and the carrier 16 is assumed to make 1 turn, then according to the principle of the differential gears, the gear 14C will make 2 turns. But since the carrier actually makes 2/7 turns, the gear 14C will make $2/7 \times 2 = 4/7$ or 0.57 turns.

The figures illustrate the variable speed transmission which includes an input shaft 10 having a terminal end 10B with a first gear 11 mounted at the terminal end 10B of the input shaft 10 to enable simultaneous rotation with the input shaft 10. A cross shaft 13 having a first end 13A, a mid point 13B and a second end 13C with the cross shaft 13 spaced apart from the terminal end 10B of the input shaft 10 such that an axis 10D of the input shaft 10 is perpendicular to a first axis 13D of the cross shaft 13. A second gear 11B mounted at the second end 13C of the cross shaft 13 to enable simultaneous rotation with the cross shaft 13 and the second gear 11B is in direct mechanical communication with the first gear 11A. A fifth gear 14A with a hub section 17, is rotatably mounted on the input shaft 10 to enable independent rotation of the fifth gear 14A and the hub section 17 of the fifth gear 14A about the input shaft 10. A third gear 14D is mounted at the first end 13A of the cross shaft 13 to enable simultaneous rotation with the cross shaft 13 and the third gear 14D is in direct mechanical communication with the fifth gear 14A. An output shaft 15 with axis 15A terminates in a fourth gear 14C with the fourth gear 14C positioned opposite the fifth gear 14A and in direct mechanical communication with the third gear 14D. Optionally a gear 11D is rotatably mounted at the first end of the cross shaft 13 to enable independent rotation about the cross shaft 13 and with the gear 11D being in direct mechanical communication with the first gear 11A. Optionally, a gear 11C is rotatably mounted opposite the first gear 11A and in direct mechanical communication with gear 11D and the second gear 11B. Optionally, a gear 14B is rotatably mounted at the second end of the cross shaft 13 opposite the third gear 14D with the gear 14B being independently rotatable about the cross shaft 13 and with the gear 14B being in direct mechanical communication with the fifth gear 14A and the fourth gear 14C. A cross shaft 13 securing means 60 secures the first end 13A and the second end 13C of the cross shaft 13 and to enable rotation of the cross shaft 13 about the first axis 13D of the cross shaft 13 and to further enable rotation of the cross shaft 13 about a second axis 13E of the cross shaft 13 which is positioned at the mid point 13B of the cross shaft 13 and is perpendicular relative to the first axis 13D. A brake means 40 controls the rotation of the hub section 17 of the fifth gear. In use, to initiate rotation of the output shaft 15 the brake means 40 is manipulated to gradually increase the rotational resistance on the hub of the fifth gear. This directs the rotational force to the output shaft 15 through the fourth gear 14C which has less rotational resistance than the fifth gear. A further increase in the rotational resistance by the brake means stops the rotation of the fifth gear, subsequent to the initial rotation of the output shaft 15 and fully inhibits rotation of the hub of the fifth gear such that the rotational power of the input shaft 10 is transferred to the cross shaft 13 causing an increase in the rotational force of the third gear. This action increases the rotational force delivered to the output shaft 15 through the fourth gear 14C which has less rotational resistance than the fifth gear. It must be stressed that this is only a theoretical explanation of the operation of the device and the inventor is not saying that this is the only explanation.

The cross shaft 13 securing means 60 preferably comprises a case 16 having a first 62, a second 64, a third 66 and a fourth 68 aperture formed therein. The hub section 17 of the fifth gear 14A is rotatably mounted in the first aperture 62 of the case 16. The output shaft 15 is rotatably mounted in the third aperture 66 of the case. The first end 13A of the cross shaft 13 is rotatably mounted in the second aperture 64 of the case, and the second end 13C of the cross shaft 13 is rotatably mounted in the fourth aperture 68 of the case so that the cross shaft 13 is able to rotate within the second and fourth apertures and so that the ability of the case to rotate or not to rotate about the hub and the output shaft is independent from the rotation of the hub and the output shaft as seen in FIG. 3.

Preferably the idler shaft 12 includes a first 72 and a second 74 end, with the gear 11C being mounted on the first end 72 of the idler shaft 12 and with the second end 74 of the idler shaft 12 being rotatably received into an axial bore 76 formed in the terminal end 15B of the output shaft 15 so that the gear 11C is able to rotate independently relative to the output shaft.

An interlocking control means 50 directly combines the rotation of the input shaft 10 with the hub section 17 of the fifth gear so that the input shaft 10 and the hub section 17 rotate at the same speed. The interlocking control means 50 includes an interlocking gear 82 mounted on the input shaft 10 proximate an end 17A of the hub section 17 of the fifth gear and an interlocking control member 84 positioned at the end 17A of the hub section 17 such that when the interlocking control member 84 is manipulated, interlocking gear 82 is mechanically engaged causing the input shaft 10 and the hub section 17 rotate at the same speed. The interlocking control member 84 includes a fork 19A which is inserted on a ring gear 86 with the ring gear slidably mounted on the end of the hub section 17 so that upon moving the fork 19A to the left as shown at FIG. 6, the ring gear 86 mechanically engages interlocking gear 82.

What is claimed is:

1. A variable transmission, comprising:
   an input shaft for providing rotational input and having a terminal end;
   a first gear mounted at said terminal end of said input shaft to enable simultaneous rotation with said input shaft;
   a cross shaft having a first end, a mid point and a second end with said cross shaft spaced apart from said terminal end of said input shaft such that an axis of said input shaft is perpendicular to a first axis of said cross shaft;
   a second gear mounted at said second end of said cross shaft to enable simultaneous rotation with said cross shaft and said second gear being in direct mechanical communication with said first gear;
   a fifth gear including a hub with said hub rotatably mounted on said input shaft to enable independent rotation of said fifth gear and said hub about said input shaft;
   a third gear mounted at said first end of said cross shaft to enable simultaneous rotation with said cross shaft and said third gear being in direct mechanical communication with said fifth gear;

an output shaft terminating in a fourth gear with said fourth gear positioned opposite said fifth gear and in direct mechanical communication with said third gear;

a cross shaft securing means for securing said first end and said second end of said cross shaft and for enabling rotation of said cross shaft about said first axis of said cross shaft and to further enable rotation of said cross shaft about a second axis of said cross shaft positioned at said mid point of said cross shaft with said second axis being perpendicular relative to said first axis; and a brake means for controlling the rotation of said hub of said fifth gear such that in use upon manipulation of the brake means to increase or decrease the rotational speed of said fifth gear, the rotational output of the output shaft may be varied in response to such manipulation.

2. The variable transmission of claim 1 further including:

a gear sixth (11D) rotatably mounted at said first end of said cross shaft to enable independent rotation about said cross shaft and with said gear (11D) being in direct mechanical communication with said first gear;

a gear seventh (11C) rotatably mounted opposite said first gear such that said gear seventh (11C) is in direct mechanical communication with said gear (11D) and said second gear;

means for mounting said gear seventh (11C); and a gear eighth (14B) positioned opposite said third gear with said gear eighth (14B) rotatably mounted at said second end of said cross shaft to enable independent rotation about said cross shaft and said gear (14B) being in direct mechanical communication with said first gear and said fourth gear.

3. The transmission of claim 2 further including an idler shaft having a first and a second end, with said seventh gear 11C being mounted on said first end of said idler shaft and with said second end of said idler shaft being rotatably received into an axial bore formed in said terminal end of said output shaft so that said gear 11C is able to rotate independently relative to said output shaft.

4. The transmission of claim 1 wherein said cross shaft securing means comprises a case having a first, a second, a third and a fourth aperture;

said hub of said fifth gear rotatably mounted in said first aperture of said case;

said output shaft rotatably mounted in said third aperture of said case;

said first end of said cross shaft rotatably mounted in said second aperture of said case; and said second end of said cross shaft rotatably mounted in said fourth aperture of said case so that said cross shaft is able to rotate within said second and fourth apertures and so that the ability of said case to rotate or not to rotate about said hub and said output shaft is independent from the rotation of said hub and said output shaft.

5. The transmission of claim 1 further including an interlocking control means for directly coupling the rotational output of said input shaft to said hub of said fifth gear such that in use the rotational rate of said output shaft is the same as the rotational rate of said input shaft.

6. The transmission of claim 1 wherein said brake means utilizes frictional force.

7. The transmission of claim 1 wherein said brake means utilizes electromagnetic force.

8. The variable transmission of claim 1 further including:

a sixth gear 11D rotatably mounted at said first end of said cross shaft to enable independent rotation about said cross shaft and with said sixth gear 11D being in direct mechanical communication with said first gear;

a gear seventh 11C mounted opposite said first gear and being in direct mechanical communication with said sixth gear 11D and said second gear;

an idler shaft having a first and a second end, with said seventh gear 11C being mounted on said first end of said idler shaft and with said second end of said idler shaft being rotatably received into an axial bore formed in said terminal end of said output shaft so that said seventh gear 11C is able to rotate independently relative to said output shaft; and a eighth gear 14B positioned opposite said third gear with said eighth gear 14B rotatably mounted at said second end of said cross shaft to enable independent rotation about said cross shaft and said eighth gear 14B being in direct mechanical communication with said fifth gear and said fourth gear.

9. The variable transmission of claim 1 further including:

a sixth gear (11D) rotatably mounted at said first end of said cross shaft to enable independent rotation about said cross shaft and with said sixth gear (11D) being in direct mechanical communication with said first gear;

an idler shaft having a first and a second end;

a seventh gear (11C) mounted opposite said first gear and being in direct mechanical communication with said gear sixth (11D) and said second gear with said seventh gear (11C) being mounted on said first end of said idler shaft and with said second end of said idler shaft being rotatably received into an axial bore formed in said terminal end of said output shaft so that said seventh gear (11C) is able to rotate independently relative to said output shaft; and a eighth gear (14B) positioned opposite said third gear with said eighth gear (14B) rotatably mounted at said second end of said cross shaft to enable independent rotation about said cross shaft and said eighth gear (14B) being in direct mechanical communication with said fifth gear and said fourth gear.

10. A variable transmission, comprising:

an input shaft having a terminal end;

a first gear mounted at said terminal end of said input shaft to enable simultaneous rotation with said input shaft;

a cross shaft having a first end, a mid point and a second end with said cross shaft spaced apart from said terminal end of said input shaft such that an axis of said input shaft is perpendicular to a first axis of said cross shaft;

a second gear mounted at said second end of said cross shaft to enable simultaneous rotation with said cross shaft and said second gear being in direct mechanical communication with said first gear;

a fifth gear including a hub with said hub rotatably mounted on said input shaft to enable independent rotation of said fifth gear and said hub about said input shaft;

a third gear mounted at said first end of said cross shaft to enable simultaneous rotation with said cross shaft and said third gear being in direct mechanical communication with said fifth gear;

an output shaft terminating in a fourth gear with said fourth gear positioned opposite said fifth gear and in direct mechanical communication with said third gear;

a gear (11D) rotatably mounted at said first end of said cross shaft to enable independent rotation about said cross shaft and with said gear (11D) being in direct mechanical communication with said first gear;

a gear (11C) rotatably mounted opposite said first gear such that said gear (11C) is in direct mechanical communication with said gear (11D) and said second gear;

means for mounting said gear (11C); and a gear (14B) rotatably mounted at said second end of said cross shaft opposite said third gear with said gear (14B) being independently rotatable about said cross shaft and with said gear (14B) being in direct mechanical communication with said fifth gear and said fourth gear;

a cross shaft securing means for securing said first end and said second end of said cross shaft and to enable rotation of said cross shaft about said first axis of said cross shaft and to further enable rotation of said cross shaft about a second axis of said cross shaft which is positioned at said mid point of said cross shaft and is perpendicular relative to said first axis;

a brake means for controlling the rotation of said hub of said fifth gear such that in use upon manipulation of the brake means to increase or decrease the rotational speed of said fifth gear, the rotational output of the output shaft may be varied in response to such manipulation; and an interlocking control means for directly coupling the rotational output of said input shaft to said hub of said fifth gear such that in use the rotational rate of said output shaft is the same as the rotational rate of said input shaft.

11. A variable transmission, comprising:

an input shaft having a terminal end;

a first gear mounted at said terminal end of said input shaft to enable simultaneous rotation with said input shaft;

a cross shaft having a first end, a mid point and a second end with said cross shaft spaced apart from said terminal end of said input shaft such that an axis of said input shaft is perpendicular to a first axis of said cross shaft;

a second gear mounted at said second end of said cross shaft to enable simultaneous rotation with said cross shaft and said second gear being in direct mechanical communication with said first gear;

a fifth gear including a hub with said hub rotatably mounted on said input shaft to enable independent rotation of said fifth gear and said hub about said input shaft;

a third gear mounted at said first end of said cross shaft to enable simultaneous rotation with said cross shaft and said third gear being in direct mechanical communication with said fifth gear;

an output shaft terminating in a fourth gear with said fourth gear positioned opposite said fifth gear and in direct mechanical communication with said third gear;

a sixth gear (11D) rotatably mounted at said first end of said cross shaft to enable independent rotation about said cross shaft and with said sixth gear (11D) being in direct mechanical communication with said first gear;

an idler shaft having a first and a second end;

a seventh gear (11C) rotatably mounted opposite said first gear and in direct mechanical communication with said sixth gear (11D) and said second gear with said seventh gear (11C) being mounted on said first end of said idler shaft and with said second end of said idler shaft being rotatably received into an axial bore formed in said terminal end of said output shaft so that said seventh gear (11C) is able to rotate independently relative to said output shaft;

a gear eighth (14B) rotatably mounted at said second end of said cross shaft opposite said third gear with said eighth gear (14B) being independently rotatable about said cross shaft and with said eighth gear (14B) being in direct mechanical communication with said fifth gear and said fourth gear;

a cross shaft securing means for securing said first end and said second end of said cross shaft and to enable rotation of said cross shaft about said first axis of said cross shaft and to further enable rotation of said cross shaft about a second axis of said cross shaft which is positioned at said mid point of said cross shaft and is perpendicular relative to said first axis;

a brake means for controlling the rotation of said hub of said fifth gear such that in use upon manipulation of the brake means to increase or decrease the rotational speed of said fifth gear, the rotational output of the output shaft may be varied in response to such manipulation; and an interlocking control means for directly coupling the rotational output of said input shaft to said hub of said fifth gear such that in use the rotational rate of said output shaft is the same as the rotational rate of said input shaft.

12. The transmission of claim 11 wherein said cross shaft securing means comprises a case having a first, a second, a third and a fourth aperture;

said hub of said fifth gear rotatably mounted in said first aperture of said case;

said output shaft rotatably mounted in said third aperture of said case;

said first end of said cross shaft rotatably mounted in said second aperture of said case; and said second end of said cross shaft rotatably mounted in said fourth aperture of said case so that said cross shaft is able to rotate within said second and fourth apertures and so that the ability of said case to rotate or not to rotate about said hub and said output shaft is independent from the rotation of said hub and said output shaft.

* * * * *